(12) United States Patent
Voillequin et al.

(10) Patent No.: US 8,879,239 B2
(45) Date of Patent: Nov. 4, 2014

(54) SUPERCAPACITOR CELL AND SUPERCAPACITIVE MODULE INCORPORATING A PLURALITY OF THESE CELLS

(75) Inventors: Baptiste Voillequin, Avon (FR); Marie Dieudonné, Laguiole (FR); Gérard Tavin, Angers (FR); Eric Violon, Amilly (FR)

(73) Assignee: Hutchinson, Paris (FR)

( * ) Notice: Subject to any disclaimer, the term of this patent is extended or adjusted under 35 U.S.C. 154(b) by 120 days.

(21) Appl. No.: 13/546,224

(22) Filed: Jul. 11, 2012

(65) Prior Publication Data

US 2013/0016450 A1 Jan. 17, 2013

(30) Foreign Application Priority Data

Jul. 13, 2011 (FR) ...................................... 11 56397

(51) Int. Cl.
| | | |
|---|---|---|
| H01G 9/00 | (2006.01) | |
| H01G 9/022 | (2006.01) | |
| H01G 9/032 | (2006.01) | |
| H01G 9/035 | (2006.01) | |
| H01G 9/08 | (2006.01) | |
| H01G 11/72 | (2013.01) | |
| H01G 9/008 | (2006.01) | |
| H01G 11/12 | (2013.01) | |
| H01G 11/78 | (2013.01) | |
| H01G 9/26 | (2006.01) | |

(52) U.S. Cl.
CPC .............. *H01G 9/016* (2013.01); *H01G 11/72* (2013.01); *Y02E 60/13* (2013.01); *H01G 11/12* (2013.01); *Y02T 10/7022* (2013.01); *H01G 11/78* (2013.01); *H01G 9/26* (2013.01); *H01G 9/08* (2013.01)
USPC ............................ 361/502; 361/522; 361/541

(58) Field of Classification Search
CPC ......... H01G 9/00; H01G 9/022; H01G 9/032; H01G 9/035; H01G 9/145; H01G 9/08; H01G 9/012; H01G 9/26; H01G 9/14; H01G 9/38; H01G 11/72; H01G 11/66; H01G 11/68; H01G 11/70; A61N 1/375

USPC .......................................... 361/502, 522, 541
See application file for complete search history.

(56) References Cited

U.S. PATENT DOCUMENTS

| 6,998,190 B2 | 2/2006 | Nobuta et al. |
|---|---|---|
| 2003/0134190 A1 | 7/2003 | Ishida et al. |
| 2007/0128472 A1* | 6/2007 | Tierney et al. ................... 429/9 |
| 2009/0014049 A1* | 1/2009 | Gur et al. ..................... 136/244 |
| 2012/0025787 A1* | 2/2012 | Rouvala et al. .............. 320/166 |

FOREIGN PATENT DOCUMENTS

| EP | 1 331 667 A2 | 7/2003 |
|---|---|---|
| JP | 2006-245442 A | 9/2006 |
| JP | 2007-294407 A | 11/2007 |
| JP | 2008-270350 A | 11/2008 |

OTHER PUBLICATIONS

Search Report for French Application No. FR 1156397 dated Apr. 17, 2012.

* cited by examiner

*Primary Examiner* — Jenny L Wagner
*Assistant Examiner* — Michael P McFadden
(74) *Attorney, Agent, or Firm* — Alston & Bird LLP

(57) ABSTRACT

A supercapacitor cell is provided having unit cells arranged in series and encapsulated in a flexible and leak-tight packaging, and a supercapacitor module having at least one stack of several of these cells. The cell includes n unit cells (n≥2) arranged side by side in series and encapsulated in the packaging, each unit cell having two upper and lower electrodes, a membrane separating them and an ionic electrolyte, the cell having inside of the packaging a plurality of current collectors, two upper and lower collector parts of which respectively cover the upper and lower electrodes. A pair of adjacent unit cells is covered with an upper or lower collector common to this pair, two truncated upper and/or lower collectors formed at two ends of the cell, two adjacent collectors respectively terminated by facing edge sections electrically insulated from one another by an insulating adhesive material covering them.

14 Claims, 1 Drawing Sheet

SUPERCAPACITOR CELL AND SUPERCAPACITIVE MODULE INCORPORATING A PLURALITY OF THESE CELLS

CROSS REFERENCE TO RELATED APPLICATIONS

The present application claims priority to French Application No. 11 56397, filed Jul. 13, 2011, the contents of which are incorporated by reference in its entirety.

FIELD

The present invention relates to a supercapacitor cell comprising unit cells arranged in series and encapsulated in a flexible and leak-tight packaging, together with a supercapacitive module capable of forming a supercapacitor and comprising in a rigid housing at least one stack of several of these cells. The invention is notably applicable, but not exclusively, to supercapacitors designed to equip automobile or aeronautical vehicles.

BACKGROUND

Supercapacitors are electrical energy storage systems particularly advantageous for applications requiring electrical energy to be carried at high power. Their capability for charging and discharging rapidly, and their increased lifetime with respect to a high-power battery make them promising candidates for a number of applications. Supercapacitors generally consist of the association of two conducting porous electrodes with a high specific surface area, immersed in an ionic electrolyte and separated by an insulating membrane, known as a "separator", which enables the ionic conductivity and avoids the electrical contact between the electrodes. Each electrode is in contact with a metal collector allowing the exchange of the electrical current with an external system. Under the influence of a potential difference applied between the two electrodes, the ions present within the electrolyte are attracted by the electrode surface having an opposite charge, thus forming an electrochemical double-layer at the interface of each electrode. The electrical energy is thus stored electrostatically by separation of the charges. The expression for the capacitance C of a supercapacitor is identical to that of a conventional capacitor, i.e.:

$C = \epsilon \cdot S / e$, where $\epsilon$ denotes the permittivity of the medium, S the surface area occupied by the double-layer, and e the thickness of the double-layer.

The capacitances achievable within supercapacitors are nevertheless much higher than those commonly reached by conventional capacitors, owing to the use of these electrodes with a maximized specific surface area, usually carbon-based, and of the extreme fineness of the electrochemical double-layer (typically of a few nanometers in thickness). These carbon-based electrodes must necessarily be conductive in order to ensure the transport of the electrical charges, porous in order to ensure the transport of the ionic charges and the formation of the electrical double-layer over a large surface area, and chemically inert so as to avoid any spurious reaction that might consume energy.

The main design parameters for supercapacitive devices are the total stored energy, the maximum deliverable power and the mass and volume densities of the two preceding quantities (i.e. the energy density and the power density). A compromise must in general be reached between these parameters, depending on the target applications. Some applications such as static mass storage devices require, above all, a large storage capacity without the maximum power being a truly limiting factor, whereas other applications, such as railroad equipment, require a high energy and power without the constraints on weight and on volume really being limiting, it being noted that the applications to automobile or aeronautical vehicles require a compromise in energy/power with very tight constraints on weight and on volume.

The energy E stored within a supercapacitor is defined according to the conventional expression for capacitors, i.e.:

$E = \frac{1}{2} \cdot C \cdot V^2$, where V is the potential of the supercapacitor.

The capacitance and the potential are two essential parameters which need to be optimized in order to promote high performance in energy, the potential mainly depending on the nature of the electrolyte and notably on its electrochemical stability (it being noted that the main families of electrolytes are organic electrolytes, comprising an organic salt dispersed within an organic solvent, and aqueous electrolytes), and the capacitance depending of the porous texture accessible in practice by this electrolyte.

A unit supercapacitor cell ("unit cell" is understood in a known manner in the present description to mean an elementary cell of minimum size that is necessary for the autonomous operation of a supercapacitor and which comprises by definition two carbon-based porous electrodes separated by an insulating membrane and impregnated with an electrolyte) usually comprises two current collectors allowing the current to be carried as far as the two electrodes. In order to be able to reach a high-power operation, the resistance to the passage of the current within the unit cell must be very small, owing to the fact that this resistance leads to losses by Joule heating which decreases the efficiency of the supercapacitor. This resistance is the sum of the resistances of the various components of the unit cell, notably the resistance of the electrolyte and that of the current collectors. In order to limit the contribution of the resistances of the collectors, it is necessary to use for the latter metals with a high conductivity which must furthermore be inexpensive and able to be easily fashioned, notably such as copper and aluminum. However, in the case of an aqueous electrolyte, the use of these metals poses problems of chemical and electrochemical stability owing to the fact that they will corrode at the oxidation potentials typically used in an aqueous solution.

A supercapacitor cell ("cell" is understood in a known manner in the present description to mean a physical unit composed of one or more unit cells connected together) is not only composed of at least two carbon-based electrodes separated by a membrane and of two collectors, but furthermore of a leak-tight packaging that is impermeable to gases and to liquids and of components ensuring the leak-tight and impermeable closure of the packaging. However, as only the active material of the electrodes contributes to the energy storage function of the cell, the weight and the volume of its other components, including the packaging, must be minimized without however limiting the performance of the cell.

Generally speaking, the design parameters of a supercapacitive module are expressed in terms of operating voltage and overall capacitance depending on the target application and on the environment of use of the module by linking the cells in series or in parallel. Linking in series allows the unitary voltages across the terminals of the cells to be summed, but to the detriment of the overall capacitance whose inverse is equal to the sum of the inverses of the unitary capacitances. In contrast to this, linking cells in parallel allows the capacitances of the cells to be summed but without modifying the voltage across the terminals of each cell.

In this context, the document U.S. Pat. No. 6,998,190 B2 may be mentioned which teaches the use in a supercapacitor of a stack of unit cells enveloped in two packaging plastic films at the junction of which current collectors are bonded or fused.

SUMMARY

One aim of the present invention is to provide a supercapacitor cell comprising n unit cells (n≥2) arranged side by side in series and encapsulated in a flexible and leak-tight packaging which allows all of the aforementioned drawbacks to be overcome, this cell notably having an upgradable structure allowing it to be adapted to the supercapacitive module incorporating it and hence to the application and to the environment of use targeted while at the same time conserving the performance characteristics of the known supercapacitors, together with a size that is neither too large (for module architectures of limited size) nor too small (for large module architectures, in view of the reduced nominal voltage of a unit cell).

Such a cell according to the invention has each unit cell comprising two upper and lower porous electrodes, an electrically insulating membrane separating the electrodes from one other and an ionic electrolyte in which the electrodes are immersed, the cell comprising, inside the packaging, a plurality of current collectors whose two upper and lower collector parts respectively cover the upper and lower electrodes, and this cell is such that at least one pair of said adjacent unit cells is covered with one said upper or lower collector common to this pair, two upper and/or lower truncated collectors being formed at two respective ends of the cell, two of said adjacent collectors being respectively terminated by facing edge sections which are electrically insulated from one another by an insulating adhesive material covering these flat sections.

Generally speaking, it will be noted that said upper and lower collector parts define, for the n unit cells, a total number of said collectors (i.e. of the common collector or collectors and of the truncated collectors) which is equal to n+1.

According to another feature of the invention, said unit cells of said at least one pair are connected together by a link section which comprises a first continuous section of said upper or lower collector part and are separated from one another by a second opposing discontinuous section of said lower or upper collector part, respectively, this first section being defined by a median portion of said common collector and this second section being defined by portions of said adjacent collectors which have said edge sections and which are sealed over this median portion by means of said insulating adhesive material.

Advantageously, said packaging can be sealed on respective external faces of said first continuous section and of said second discontinuous section between two said unit cells of said at least one pair, by means of said insulating adhesive material.

Preferably, a number n≥3 of unit cells is used, with at least two said consecutive pairs which define at least two said common collectors, upper and lower respectively, which are alternated in staggered fashion along the cell over said two collector parts, and at least two said discontinuous sections, upper and lower respectively, also alternating over these parts.

According to another preferred feature of the invention, notably for application to an automobile vehicle, said upper and lower electrodes are each formed from a carbon monolith, and/or said electrolyte is of the aqueous type.

It will be noted that the use of monolithic carbon allows high mass capacitances to be obtained for the unit cells with improved energy densities with respect to non-monolithic electrodes obtained by dispersion of a conducting porous carbon in an inert organic binder and a solvent, then by spreading of the paste obtained over the current collector. Indeed, such a binder has the drawback of thickening and of making each unit cell heavier without being active for storing energy. In order to reach high storage energies and high energy densities, it is therefore particularly advantageous to incorporate the active material into the unit cells in the form of monoliths (i.e. without inert binder for dispersing the active material, which improves ipso facto the mass and volume energy densities achievable).

It will also be noted that the aqueous electrolytes, composed for example of aqueous solutions of sulfuric acid, of potassium chloride, of potassium sulfate or of other salts in an acid, base or neutral solution, have the advantage of being inexpensive and non-flammable in contrast to organic electrolytes which are expensive, inflammable, toxic and potentially polluting, thus posing problems of safety of use in an automobile vehicle, for example. These aqueous electrolytes are therefore advantageously usable in such a vehicle, although having the relative drawback of a lower applicable potential (typically 1.2 V) with respect to that which is applicable with an organic electrolyte (typically 2.7 V).

In this preferred case, notably for automobile vehicles where monolithic carbon-based electrodes and an aqueous electrolyte are used, said collectors can advantageously each comprise a metal conductor which is coated with a polymer layer, for protection against said electrolyte, on its external face in contact with said packaging and on its internal face turned toward the opposing lower and upper collectors, respectively.

It will be noted that, in the preferred case of an active material for each electrode in the form of a carbon monolith, this protection layer covering the two faces of each collector advantageously allows a good contact between this monolith and the metal conductor of the collector to be obtained while at the same time allowing this conductor, sensitive to corrosion in an aqueous solution, to be protected. The result of this is that the electrical contact between each electrode and the current collector covering it is improved, which in turn allows the resistance of the interface between this active material and the adjacent metal conductor to be minimized.

Also by way of a preferred embodiment, said packaging comprises a single deformable film folded back on itself or else two deformable films of a multilayer plastic material, metallized or not, two respectively upper and lower faces of this single film or else these two films being sealed preferably by heat sealing between said unit cells in adjacent pairs and on end edges of the cell so as to define dead volumes within these unit cells, this packaging preferably having a thickness in the range between 50 μm and 200 μm.

It will be noted that this packaging according to the invention, although chosen not to be very dense or very thick, hence relatively light, must fulfill its functions of leak tightness and of impermeability.

A supercapacitive module according to the invention, which is capable of forming a supercapacitor, comprises:

a rigid housing preferably in the form of a parallelepiped and composed of two parts soldered or bonded onto one another, at least one stack of m (m≥2) cells disposed on a bottom wall of the housing, each cell comprising n unit cells (n≥2) arranged side by side in series and encapsulated in a flexible and leak-tight packaging, and means for maintaining under pressure said at least one stack which push up against a top wall of the housing and against a said cell nearest to said at least one stack, and this module of the invention is characterized in that each of said cells is such as defined hereinabove.

Advantageously, this module can comprise a said stack of m≥5 cells, each of the cells comprising n≥5 unit cells.

According to another feature of the invention, said means for maintaining under pressure can comprise at least one force return means, such as a spring or an air cushion, which is mounted against said top wall and against said cell nearest to said at least one stack and which is optionally combined with at least one plate disposed between this nearest cell and this force return means, for optimizing the distribution of forces over the respective surfaces of said electrodes.

Equally advantageously, the external face of said housing, preferably on said bottom wall, can have ribs and serrations for mechanical reinforcement of the module which optionally form guides and accommodations receiving strapping loops.

According to another feature of the invention, this module can comprise one said stack all of said cells of which are electrically connected together by means of two terminal collector blocks which are respectively connected to two metal lugs corresponding to the two terminals of the module, each lug having one lug end internal to said housing assembled to said adjacent collector block by soldering, brazing or mechanical contact and one lug free end external to this housing designed to receive a connection element.

Advantageously, only said lugs protrude from said housing, these lugs being assembled to said collector blocks at heights from said bottom wall that are identical or not, with said free ends of these lugs respectively protruding from the housing preferably in a manner adjacent to said bottom wall and in a manner adjacent to said top wall.

BRIEF DESCRIPTION OF THE DRAWINGS

Other features, advantages and details of the present invention will become apparent upon reading the following description of one exemplary embodiment of the invention, presented by way of non-limiting illustration, and said description being presented with reference to the appended drawing, in which.

DETAILED DESCRIPTION

Figure 1:
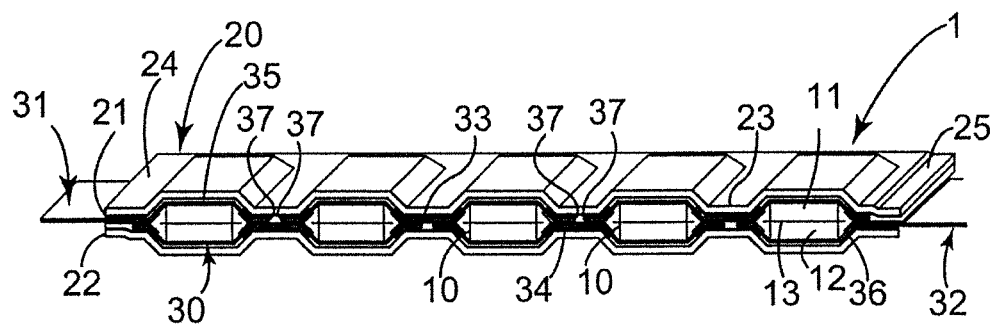
FIG. 1 is a partial schematic view in perspective and in transverse cross section of a supercapacitor cell with several unit cells according to one exemplary embodiment of the invention.

The cell 1 in FIG. 1 comprises, in this example, n=5 unit cells 10 arranged side by side in series and enveloped in a packaging 20 composed of two flexible plastic upper 21 and lower 22 films, which are deformable and leak tight (as a variant, this packaging could be formed from a single flexible, deformable and leak-tight film folded back on itself). Each unit cell 10 comprises two porous upper 11 and lower 12 electrodes which are each made of a carbon monolith, are separated by an electrically insulating membrane 13 and which are immersed in an ionic aqueous electrolyte (not visible).

The cell 1 comprises, inside of the packaging 20, a current collector unit 30 two upper 31 and lower 32 collector parts of which respectively cover the upper 11 and lower 12 electrodes.

According to the invention, each pair of adjacent unit cells 10 is covered, on the one hand, by an upper 33 or lower 34 collector common to this pair and, on the other hand, by two portions of this common collector 33, 34, lower or upper respectively, it being noted that the cell 1 has, at the ends of a line, two truncated collectors 35 and 36. "Truncated collector" is understood to mean, in the present description, a common collector 33, 34 which is truncated at each electrical connection end of the cell 1, in the sense that it only has about a half-portion of this common collector 33, 34. In other words, each common collector 33, 34 is shared between two adjacent unit cells 10, and two consecutive common collectors 33 and 34 are disposed on either side of the median longitudinal plane of the cell 1 containing the membranes 13, which means that these common collectors 33, 34 are disposed in opposing alternation with respect to this plane between the upper 31 and lower 32 collector parts.

In addition, and as visible in FIG. 1, two adjacent collectors 33, 34, 35, 36 are respectively terminated by facing edge sections 37 which are electrically insulated from each other by an insulating adhesive film 38a covering these edge sections 37, which protects these edge sections 37 not only from corrosion but furthermore prevents these adjacent connectors 33 to 36 from touching each other and forming short-circuits, as will be explained hereinbelow.

In the example in FIG. 1, this cell 1 comprises two upper common collectors 33, two lower common collectors 34, an upper truncated collector 35 and a lower truncated collector 36, this being a total of six collectors 33 to 36.

Figures 2, 3:
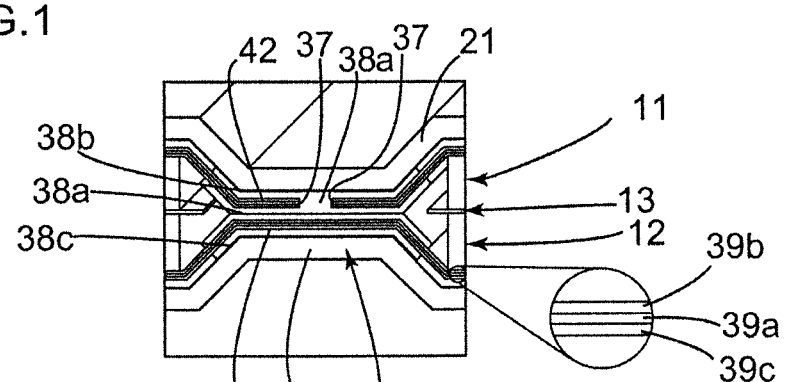
FIG. 2 is a detailed view also in perspective and in transverse cross section corresponding to the framed area in FIG. 1 and showing the structure of each link section between adjacent unit cells of this cell.
FIG. 3 is a magnified detailed view of a current collector in FIG. 2 showing, in a transverse cross section, the structure of this collector.

More precisely, and as can be seen in FIG. 2, the unit cells 10 of each pair are connected together by a link section 40 which comprises a first continuous section 41 of the collector part 31 or 32 defined by a median portion of a common collector 33, 34, and they are separated from each other by a second opposing discontinuous section 42 of the other collector part 32 or 31 defined by portions of the adjacent collectors 33 to 36 which comprise the edge sections 37 and which are sealed onto this median portion 41 by means of the insulating adhesive film 38a.

It can be seen in the magnified view in FIG. 3 that each collector 33 to 36 comprises a metal conductor 39a advantageously coated on its two faces with thin upper 39b and lower 39c protection films and, in the detailed view in FIG. 2, that two other insulating adhesive films 38b and 38c (for example using the same material as the film 38a bonding each continuous section 41 to the discontinuous section 42 facing it) provide an adhesive interface, on the one hand, between each discontinuous section 42 of the upper collector part 31 and the upper packaging film 21 (film 38b) and, on the other hand, between each continuous section 41 of the lower collector part 32 and the lower packaging film 22 (film 38c).

It will be noted that this adhesive and electrically insulating film notably provides an aid for the soldering between two adjacent unit cells 10, by imprisoning in a leak-tight manner the link sections 40 between unit cells 10, owing to the fact that this material is deposited at the interfaces between each upper 39b and lower 39c protection layer for the collectors 33 to 36 and the corresponding packaging films 21 and 22.

It will also be noted that this insulating adhesive material allows the bare edge sections 37 (not coated with the protection layers 39b and 39c) of the metal conductor of each collector 33 to 36 to be protected by the flowing of this material which then fills the region left free between these edge sections 37 (this inter-edge section region 37 is shown without insulating material in FIG. 2 for reasons of clarity, prior to the flowing of the latter), which allows a preparation by spreading or in-line dipping of the collector unit 30 as a roll followed by cutting up of the collectors 33 to 36. Although this cutting up exposes the bare edge sections 37, the latter are protected by deposition of the film 38a which thus provides the insulation between two adjacent collectors 33 to 36 avoiding any short-circuit due to a contact between the latter.

This insulating adhesive material is therefore deposited in the form of films 38a, 38b, 38c coating the collectors 33 to 36 and having a geometry in the form of narrow rectangular tabs bonded flat onto the link sections 40 of these collectors 33 to 36 (while slightly overhanging on either side of these sections 40). It will be noted that the form of a dumbbell seen in FIG. 2 for each central adhesive film 38a deposited between and in contact with the respective internal faces of each continuous 41 and discontinuous 42 section is only obtained after the operations for cutting up and for assembling the cell 1, by the deformation that each film 38a undergoes at the time when the cell 1 is formed due to the thicknesses of electrodes 11 and 12 and by the contact made between each upper 38b and lower 38c film.

In order to provide the leak-tight sealing between the unit cells 10 connected in series, sealing of the packaging 20 is carried out, e.g. by heat sealing, it being noted that, as a variant, it may be cold-sealed or bonded within each interval 23 corresponding to the link sections between unit cells 10 and on the two longitudinal edges 24 and 25 of the packaging 20.

By way of material usable for this packaging 20, one or more plastic multilayer films 21 and 22 may be mentioned, aluminized or not, with high impermeability running over the entire length necessary for enclosing the n unit cells 10 connected side by side in series. Preferably, a trilayer PE/PA/PE (polyethylene/polyamide/polyethylene) film is used with a thickness that can be in the range between 50 μm and 200 μm.

The geometry chosen for the packaging film or films 21 and 22 is such that it must have a width that is sufficient to include a dead volume within each of the n-unit cells 10, in order to form a space necessary for the outgassing of the unit cells 10 during the first cycles. Subsequently, the unit cells 10 are re-cut up in vacuum to allow the surplus of gas to escape and re-soldered as close as possible to the electrodes 11 and 12. This dead volume also allows a temporary reserve of electrolyte to be formed at the start, for the duration of the cycling operations necessary for the filling of the electrodes 11 and 12 by this electrolyte.

One example of cell 1 according to the invention fabricated and assembled by the Applicant has used:
 carbon monolithic electrodes 11 and 12 with dimensions 50×25 mm² and with a thickness of 0.3 mm;
 a separator formed from a cellulose membrane SEPARION® of 30 μm in thickness and with dimensions 60×35 mm;
 an electrolyte composed of Fischer sulfuric acid at 1 mol/L;
 collectors 33 to 36 made of a copper conductor 39a of 12.5 μm in thickness and with dimensions 76×54 mm;
 adhesive films 38a, 38b, 38c composed of PA/PE bilayers with a thickness of 50 μm and with dimensions 15×104 mm;
 packaging films 21, 22 formed of PE/PA/PE trilayers with a thickness of 120 μm and dimensions 260×104 mm; and
 polymer protection layers 39b and 39c of 20 μm in thickness when dry.

It should be noted that this cell architecture 1 according to the invention notably allows:
 the number of unit cells 10 set side by side to be adapted and hence the nominal voltage of operation of the cell 1 to be adapted to the expected nominal voltage for the application targeted;
 an identical geometry to be conserved for all the components whatever the size of the cell 1, except for the packaging film or packaging films 21 and 22 whose length is to adapted to the number of unit cells 10;
 a nominal voltage of the cell 1 to be used that is sufficiently high to correspond to the usual voltages used in low voltage electronic and electrical systems;
 the preforming of the shapes of the or of each packaging film 21, 22 to be obviated, which allows not only a step for mechanical pre-fatigue of the or of each film 21, 22 to be avoided but furthermore full advantage of the flexibility of the latter to be taken because the pre-forming would impose a shape and a dimension on the positioning of the electrode 11, 12, which it is the idea of the present invention to avoid; and
 advantage to be taken of this insulating adhesive material 38a, 38b, 38c for protecting the edge sections 37 of the collectors 33 to 36, which allows an identical preparation according to the size of the cell 1 and a continuous preparation of the collector unit reel 30, with sectioning of the collectors 33 to 36 after the application of the protection layers 39b and 39c but with the protection of the edge sections 37 by this insulating adhesive material.

Figure 4:
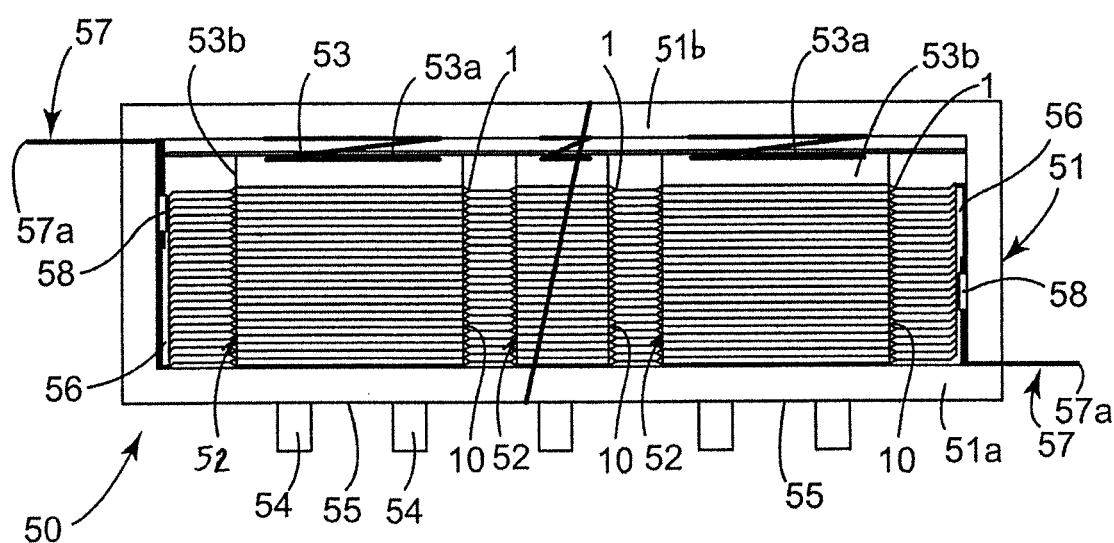
FIG. 4 is a schematic transverse cross-sectional view of a supercapacitor module according to one example of the invention, incorporating a stack of cells, for example such as that in FIG. 1.

FIG. 4 shows schematically and partially a supercapacitor module 50 according to the invention, which comprises:
 a rigid housing of parallelepipedal form 51 made of thermo-hardening plastic formed of two parts, for example symmetrical to one another, which are soldered or bonded onto one another (the contact geometry between these two parts being horizontal at mid-height or else along a diagonal of the parallelepiped),
 a stack 52 of several cells 1 mounted on top of one another which is disposed on a bottom wall 51a of the housing 51, each cell 1 for example comprising five unit cells 10 arranged side by side in series and encapsulated in a flexible and leak-tight packaging 20 in the same way as what has just been described with reference to FIG. 1 (the housing 51 is shown cut in the direction of its length which explains why only three unit cells 10 are visible for each cell 1 in FIG. 4), and
 means for maintaining under pressure 53 the stack 52 which push against a top wall 51b of the housing 51 and on the last upper cell 1 of the stack 52, these means 53 being for example composed of springs 53a respectively mounted on top of the upper unit cells 10 of this stack 52 and installed against this top side 51b and against plates 53b applied onto these unit cells 10 for a better distribution of forces on the surfaces of the electrodes 11 and 12.

These plates 53b are advantageously formed with a structure of low density and of high mechanical performance, such as a composite honeycomb structure or a thermo-hardening foam.

As a variant, these means for maintaining under pressure can comprise air cushions which are mounted under compression between this top wall 51b and the stack 52 and which are inflated once in position in the housing 51 or else prior to this positioning.

In addition and as illustrated in FIG. 4, the housing 51 advantageously has on the external face of its bottom wall 51a ribs 54 and serrations 55 for mechanical reinforcement of the module 1 which can form guides-accommodations receiving strapping loops (not shown).

In order to form the connection between all the cells 1 of the stack 52, a fixation by soldering, brazing or by mechanical contact (e.g. by rivets) of two terminal collectors 56 of these cells 1 is effected respectively to two metal lugs 57 (e.g. made of brass, copper, aluminum or steel) corresponding to the terminals of the module 1. Each collector terminal 56 and the adjacent lug 57 are thus connected within a connection region 58, it being noted that each lug 57 has one end internal to the housing 51 and one end 57a external to this housing 51 which has the function of serving as a connection device for the module 50.

This fixing between collector terminal 56 and lug 57 can be effected at mid-height of the stack 52 for the two lugs 57 or else, in the variant illustrated in FIG. 4, by providing these lugs 57 respectively at the top and at the bottom of this stack 52. Seen from outside of the housing 51, the two lugs 57 according to this variant therefore protrude from the housing 51 near to opposing sides of the parallelepiped (i.e. the bottom wall 51a and top wall 51b).

One example of housing 50 according to the invention fabricated and assembled by the Applicant has used:

two identical parts forming the housing 51 made of polyamide loaded with glass fibers, with a wall thickness of 4 mm and assembled by bonding with external dimensions of 70 mm for the width, 185 mm for the length and 95 mm for the height;

ten springs 53a exerting the force needed to obtain 2 bars of contact pressure on the cells 1, the force of these springs 53a being distributed over the stack 52 of unit cells 10 by means of five plates 53b connected together in a flexible fashion; and two lugs 57 composed of copper plates of 0.5 mm in thickness, of 50 mm in width and overhanging by 20 mm, which are respectively soldered to the two terminal collectors 56.

It will be noted that the module 50 of the invention notably allows it:

to be readily adaptable, only the height of the housing 51 being to be adapted as a function of the number of associated cells 1;

to take advantage of the flexible packaging 20 allowing the pressure forces over all of the stacked cells 1 to be transmitted on the scale of the module 50 and hence to make the stacking 52 possible (which could not be envisioned without this packaging 20 by placing the electrodes 11 and 12 directly on top of one another);

to obtain a satisfactory stack 52 which maintains the applied pressure thanks to these flexible packaging elements 20 and to the unitary pressure application by the above-mentioned means for maintaining under pressure 53;

to obtain a good connectivity with a single lug 57 for each terminal of the module 50; and to obtain a good mechanical resistance of the whole of the module 50 since only the two lugs 57 protrude from the housing 51.

The invention claimed is:

1. A cell of a supercapacitor comprising n unit cells (n≥2) arranged side by side in series and encapsulated in a flexible and leak-tight packaging, each unit cell comprising two upper and lower porous electrodes, an electrically insulating membrane separating these electrodes from one another and an ionic electrolyte in which these electrodes are immersed, the cell comprising, inside the packaging, a plurality of current collectors whose two upper and lower collector parts respectively cover the upper and lower electrodes, wherein at least one pair of said adjacent unit cells is covered with one said upper or lower collector common to this pair, two upper and/or lower truncated collectors being formed at two respective ends of the cell, two of said collectors that are adjacent being respectively terminated by facing edge sections which are electrically insulated from one another by an insulating adhesive material covering these edge sections.

2. The cell according to claim 1, wherein said unit cells of said at least one pair are connected together by a link section which comprises a first continuous section of said upper or lower collector part and are separated from one another by a second opposing discontinuous section of said lower or upper collector part, respectively, this first section being defined by a median portion of said common collector and this second section being defined by portions of said adjacent collectors which have said edge sections and which are sealed over this median portion by means of said insulating adhesive material.

3. The cell according to claim 2, wherein said packaging is sealed over respective external faces of said first continuous section and of said second discontinuous section between two said unit cells of said at least one pair, by means of said insulating adhesive material.

4. The cell according to claim 2, wherein n≥3, with at least two said consecutive pairs which define at least two said common collectors, upper) and lower respectively, which are alternated in staggered fashion along the cell over said two collector parts, and at least two said discontinuous sections upper and lower respectively also alternating over these parts.

5. The cell according to claim 1, wherein said upper and lower collector parts define for said n unit cells a total number of said collectors equal to n+1.

6. The cell according to claim 1, wherein said upper and lower electrodes are each formed on a carbon monolith, and/or in that said electrolyte is of the aqueous type.

7. The cell according to claim 6, wherein said collectors each comprise a metal conductor which is coated with a polymer layer for protection against said electrolyte, on its external face in contact with said packaging and on its internal face turned toward the opposing lower and upper collectors, respectively.

8. The cell according to claim 1, wherein said packaging comprises a single deformable film folded back on itself or else two deformable films of a multilayer plastic material, metallized or otherwise, two faces respectively upper and lower of this single film or else these two films being sealed by heat sealing between said unit cells adjacent in pairs and on end edges of the cell so as to define dead volumes within these unit cells, said packaging having a thickness in the range between 50 μm and 200 μm.

9. A supercapacitive module capable of forming a supercapacitor, the module comprising:
  a rigid housing in the form of a parallelepiped and composed of two parts soldered or bonded onto one another,
  at least one stack of m (m≥2) cells disposed on a bottom wall of the housing, each cell comprising n unit cells (n≥2) arranged side by side in series and encapsulated in a flexible and leak-tight packaging and
  means for maintaining under pressure said at least one stack which push up against a top wall of the housing and against one said cell nearest to said at least one stack,
  wherein each of said cells is defined as in claim 1.

10. The module according to claim 9, wherein the module comprises one said stack of m≥5 cells, each of the cells comprising n≥5 unit cells.

11. The module according to claim 9, wherein said means for maintaining under pressure comprise at least one force return means, such as a spring or an air cushion, which is mounted against said top wall and against said cell nearest to said at least one stack and which is optionally combined with at least one plate disposed between this nearest cell and this force return means, for optimizing the distribution of forces over the respective surfaces of said electrodes.

12. The module according to claim 9, wherein the external face of said housing on said bottom wall includes ribs and serrations configured for mechanical reinforcement of the module which optionally form guides and accommodations receiving strapping loops.

13. The module according to claim 9, wherein the module comprises one said stack, all of said cells of which are electrically connected together by means of two terminal collector blocks which are respectively connected to two metal lugs corresponding to the two terminals of the module, each lug having one lug end internal to said housing assembled to said adjacent collector block by soldering, brazing or mechanical contact and one lug free end external to this housing designed to receive a connection element.

14. The module according to claim 13, wherein only said lugs protrude from said housing, these lugs being assembled to said collector blocks at heights from said bottom wall that are identical or not, with said free ends of these lugs respectively protruding from the housing in a manner adjacent to said bottom wall and in a manner adjacent to said top wall.

* * * * *